(12) United States Patent
Matera et al.

(10) Patent No.: US 10,682,769 B2
(45) Date of Patent: Jun. 16, 2020

(54) CLOSING APPARATUS FOR USE WITH A MULTI-PIECE, HINGED, HYDROPONIC TOWER

(71) Applicant: MJNN, LLC, South San Francisco, CA (US)

(72) Inventors: Matthew Matera, San Francisco, CA (US); Adam Thomas Stagnaro, Santa Cruz, CA (US); Maria Malone, San Francisco, CA (US); Anna Olson, San Mateo, CA (US); Brice Klein, San Francisco, CA (US); Tamara Hasoon, Redwood City, CA (US); Merritt Jenkins, San Francisco, CA (US); Andy Dubel, Pacifica, CA (US)

(73) Assignee: MJNN, LLC, South San Francisco, CA (US)

( * ) Notice: Subject to any disclaimer, the term of this patent is extended or adjusted under 35 U.S.C. 154(b) by 0 days.

(21) Appl. No.: 16/397,142

(22) Filed: Apr. 29, 2019

(65) Prior Publication Data
US 2020/0039087 A1 Feb. 6, 2020

Related U.S. Application Data

(60) Provisional application No. 62/764,399, filed on Jul. 31, 2018, provisional application No. 62/764,400, filed on Jul. 31, 2018.

(51) Int. Cl.
*B25J 15/00* (2006.01)
*E05D 1/04* (2006.01)
(Continued)

(52) U.S. Cl.
CPC .......... *B25J 15/0019* (2013.01); *A01G 31/06* (2013.01); *B65G 13/02* (2013.01); *E05C 19/06* (2013.01);
(Continued)

(58) Field of Classification Search
CPC ........ B25J 15/0019; B65G 13/02; E05D 1/06; E05D 1/04; E05F 1/00; E05F 15/60;
(Continued)

(56) References Cited

U.S. PATENT DOCUMENTS 2,842,920 A * 7/1958 Carkhuff ................... B65B 7/26
53/136.3
5,249,406 A * 10/1993 Kalmanides .............. B65B 7/26
53/377.5
(Continued)

*Primary Examiner* — Lynn E Schwenning
(74) *Attorney, Agent, or Firm* — Patent Law Office of David G. Beck

(57) ABSTRACT

A tower closing apparatus is provided that is configured to simplify the closing of a multi-piece, hinged hydroponic tower. The hydroponic tower closing apparatus utilizes a collection of static and continuously moving components (e.g., motor driven drive rollers, alignment rollers, tower body alignment rollers, face plate manipulation rollers, face closing rollers, etc.) to close a hydroponic tower as it passes through the apparatus. In particular, as the tower is driven through the closing apparatus, a series of face plate manipulation rollers gradually rotate the face plate(s) relative to the tower body, moving the face plate(s) from a fully open position to a partially closed position. Next a series of face closing rollers continue to rotate the face plate(s) from the partially closed position to the fully closed position, forcing the fasteners to latch the face plate(s) into position.

23 Claims, 13 Drawing Sheets

(51) Int. Cl.
  *E05F 15/60*  (2015.01)
  *A01G 31/06*  (2006.01)
  *E05C 19/06*  (2006.01)
  *B65G 13/02*  (2006.01)
  *E05D 1/06*  (2006.01)
  *E05F 1/00*  (2006.01)

(52) U.S. Cl.
  CPC .................. *E05D 1/04* (2013.01); *E05D 1/06* (2013.01); *E05F 1/00* (2013.01); *E05F 15/60* (2015.01); *E05Y 2900/60* (2013.01)

(58) Field of Classification Search
  CPC ..... E05C 19/06; E05Y 2900/60; A01G 9/025; A01G 31/06
  USPC ........... 414/754; 53/285, 286, 300, 316, 367
  See application file for complete search history.

(56) References Cited

U.S. PATENT DOCUMENTS

| | | | | |
|---|---|---|---|---|
| 5,584,408 A * | 12/1996 | Orkisz | ................. | B65D 43/162 220/4.22 |
| 8,800,252 B2 * | 8/2014 | Vodonos | ............... | B65B 7/2842 100/154 |
| 2005/0132666 A1 * | 6/2005 | Dyke | ..................... | B65B 7/285 53/377.6 |

* cited by examiner

CLOSING APPARATUS FOR USE WITH A MULTI-PIECE, HINGED, HYDROPONIC TOWER

CROSS-REFERENCE TO RELATED APPLICATION

This application claims benefit of the filing dates of U.S. Provisional Patent Application Ser. Nos. 62/764,400, filed 31 Jul. 2018, and 62/764,399, filed 31 Jul. 2018, the disclosures of which are incorporated herein by reference for any and all purposes.

FIELD OF THE INVENTION

The present invention relates generally to hydroponic growing systems and, more particularly, to a device and system configured to close a hinged, multi-piece hydroponic tower.

BACKGROUND OF THE INVENTION

Given the continued growth of the world's population, and given that the regions allocated for agricultural pursuits have decreased or simply become less favorable to such activities, the ability of conventional farms to feed the world's growing population has become increasingly taxed. Additionally, since population centers and agricultural centers are frequently not co-located, and due to the time and expense associated with shipping agricultural goods, in many regions of the world only the wealthy are able to obtain adequate supplies of non-processed food, i.e., raw fruits and vegetables. Furthermore, the fruits and vegetables that do reach population centers are likely to be of decreased nutritional content and flavor, both due to the distance that they have traveled and the fact that much of today's produce is bred for durability and fertility rather than flavor & nutrition. As a result, there has been a renewed interest in soilless growing techniques that do not require the use of pesticides, drastically reduce the use of water, and allow for growing varietals that are bred for nutrition and flavor instead of durability.

Hydroponics is a soilless growing technique in which plants are grown using a liquid solution of water and nutrients. The roots of the plants are typically maintained in a fibrous or granular material, often comprised of plastic, and fed via a wick, drip, nutrient film, or other nutrient delivery system. Hydroponic growing systems are often established within indoor facilities, thus allowing them to be located in or near population centers. This approach also provides exceptional climate control (i.e., temperature, humidity, air flow, $CO_2$ concentration, light wavelength, intensity and duration, etc.) as well as improved pest and disease control, thus allowing an indoor hydroponic farm to succeed in a region in which the outside environment and/or the soil conditions are inhospitable to the use of conventional farming techniques. Furthermore, hydroponic and other soilless growing techniques can yield extremely high plant densities, especially in those instances in which either horizontal stacking systems or vertical growth towers are used.

While hydroponic farming techniques offer a number of advantages over conventional farming techniques, in order to achieve large-scale adoption of these techniques it is vital that the cost per plant be competitive with the costs associated with conventional farming techniques. Accordingly, the present invention provides an apparatus that simplifies hydroponic tower maintenance and reuse.

SUMMARY OF THE INVENTION

A hydroponic tower closing apparatus is provided that is configured to close a multi-piece, hinged, hydroponic tower, where the hydroponic tower is comprised of (i) a tower body that defines at least a first tower cavity, where a first edge portion of the tower body includes a first tower body hinge member; (ii) a first tower face plate, where an edge portion of the first tower face plate includes a first face plate hinge member, where the first tower face plate is hingeably coupled to the tower body via the first tower body hinge member and the first face plate hinge member, where the first tower face plate is positionable relative to the tower body in at least a first tower cavity closed position and a first tower cavity open position, and where the first tower face plate includes a first plurality of plant container cut-outs configured to accept a first plurality of plant containers; and (iii) a first fastener configured to temporarily latch the first tower face plate to the tower body when the first tower face plate is in the first tower cavity closed position. The hydroponic tower closing apparatus is comprised of (i) a drive system that propels the multi-piece hydroponic tower through the hydroponic tower closing apparatus; (ii) an alignment system that aligns the multi-piece hydroponic tower body within the hydroponic tower closing apparatus; and (iii) a tower closing system configured to (a) move the first tower face plate from the first tower cavity open position to the first tower cavity closed position, and (b) latch the first tower face plate to the tower body with the first fastener.

In one aspect of the invention, the tower closing system may include a closing initiation stage and a closing finalization stage, where the closing initiation stage is configured to move the first tower face plate from the first tower cavity open position to a first tower face plate partially closed position, and where the closing finalization stage is configured to (i) move the first tower face plate from the first tower face plate partially closed position to the first tower cavity closed position and (ii) latch the first tower face plate to the tower body with the first fastener. The closing initiation stage may include a plurality of face plate manipulation rollers that are configured to (i) force the first tower face plate to rotate about the first tower body hinge member and (ii) gradually move the first tower face plate from the first tower cavity open position to the first tower face plate partially closed position, where the first tower face plate rides on top of the plurality of face plate manipulation rollers as the multi-piece hydroponic tower is propelled through the hydroponic tower closing apparatus, and where a height of each face plate manipulation roller of the plurality of face plate manipulation rollers gradually increases with increasing distance from the entrance to the hydroponic tower closing apparatus. The closing initiation stage may further include at least one idler roller that is preferably located closer to the entrance of the hydroponic tower closing apparatus than the plurality of face plate manipulation rollers and which is configured to limit initial rotation of the first tower face plate about the first tower body hinge member. The alignment system may include a plurality of alignment rollers located within the closing initiation stage and configured to maintain alignment of the multi-piece hydroponic tower body as the plurality of face plate manipulation rollers rotate the first tower face plate about the first tower body hinge member. The closing finalization stage may include at least one face closing roller configured to (i) move the first tower face plate from the first tower face plate partially closed position to the first tower cavity closed position and (ii) latch the first tower face plate to the tower body with the first fastener. The alignment system may include a plurality of alignment rollers located within the closing finalization stage and configured to maintain alignment of the multi-piece hydroponic tower body as the at least one face closing roller moves the first tower face plate to the first tower cavity closed position and latches the first tower face plate to the tower body with the first fastener. The first fastener may be comprised of a first snap-fit fastener, where the at least one face closing roller is configured to apply sufficient force to the first tower face plate to press the snap gland of the first snap-fit fastener, preferably located on the first tower plate, into a corresponding snap gland receptacle, preferably located on the tower body. The alignment system may include at least one set of tower body alignment rollers, the at least one set of tower body alignment rollers including a first tower body alignment roller and a second tower body alignment roller, where the first tower body alignment roller is located on a first side of the tower body and configured to locate and align the first side of the tower body as the at least one face closing roller latches the first tower face plate to the tower body with the first snap-fit fastener, and where the second tower body alignment roller is located on a second side of the tower body and configured to locate and align the second side of the tower body as the at least one face closing roller latches the first tower face plate to the tower body with the first snap-fit fastener.

In another aspect, the drive system may be comprised of at least one drive roller coupled to a drive motor and configured to contact the tower body along at least a first tower body side. Operation of the drive motor forces rotation of the at least one drive roller, thereby propelling the multi-piece hydroponic tower through the hydroponic tower closing apparatus. The alignment system may include at least one alignment roller configured to contact the tower body along at least a second tower body side.

In another aspect, the multi-piece hydroponic tower may include (i) a first modified V-shaped groove running along the length of the first side of the tower body, the first modified V-shaped groove comprising a first inner groove wall, a first sloped groove wall that couples the first edge of the first inner groove wall to the first edge of the first side of the tower body, and a second sloped groove wall that couples the second edge of the first inner groove wall to the second edge of the first side of the tower body; and (ii) a second modified V-shaped groove running along the length of the second side of the tower body, the second modified V-shaped groove comprising a second inner groove wall, a third sloped groove wall that couples the first edge of the second inner groove wall to the first edge of the second side of the tower body, and a fourth sloped groove wall that couples the second edge of the second inner groove wall to the second edge of the second side of the tower body. The first inner groove wall may be substantially parallel to the first side of the tower body and substantially perpendicular to the first tower cavity rear wall, and the second inner groove wall may be substantially parallel to the second side of the tower body and substantially perpendicular to the first tower cavity rear wall. The drive system may include a plurality of drive rollers comprising at least a first drive roller and at least a second drive roller, where the first drive roller is coupled to a drive motor and configured to contact the tower body within the first modified V-shaped groove, preferably contacting the tower body via the first inner groove wall. Operation of the drive motor forces rotation of the first drive roller, thereby propelling the multi-piece hydroponic tower through the hydroponic tower closing apparatus. The second drive roller is not coupled to the drive motor and is configured to contact the tower body within the second modified V-shaped groove, preferably contacting the tower body via the second inner groove wall. The second drive roller may be mounted via a pneumatic or spring coupler and configured to apply pressure to the tower body via the second inner groove wall. The tower closing system may include a closing initiation stage and a closing finalization stage, where the closing initiation stage may include a plurality of face plate manipulation rollers that are configured to (i) force the first tower face plate to rotate about the first tower body hinge member and (ii) gradually move the first tower face plate from the first tower cavity open position to the first tower face plate partially closed position, where the first tower face plate rides on top of the plurality of face plate manipulation rollers as the multi-piece hydroponic tower is propelled through the hydroponic tower closing apparatus, and where a height of each face plate manipulation roller of the plurality of face plate manipulation rollers gradually increases with increasing distance from the entrance to the hydroponic tower closing apparatus, and where the closing finalization stage may include at least one face closing roller configured to (i) move the first tower face plate from the first tower face plate partially closed position to the first tower cavity closed position and (ii) latch the first tower face plate to the tower body with the first fastener. The alignment system may include a first plurality of alignment rollers located within the closing initiation stage and configured to maintain alignment of the multi-piece hydroponic tower body as the plurality of face plate manipulation rollers rotate the first tower face plate about the first tower body hinge member; and the alignment system may include a second plurality of alignment rollers located within the closing finalization stage and configured to maintain alignment of the multi-piece hydroponic tower body as the at least one face closing roller moves the first tower face plate to the first tower cavity closed position and latches the first tower face plate to the tower body with the first fastener. The closing initiation stage may further include at least one idler roller that is preferably located closer to the entrance of the hydroponic tower closing apparatus than the plurality of face plate manipulation rollers and which is configured to limit initial rotation of the first tower face plate about the first tower body hinge member. The first fastener may be comprised of a first snap-fit fastener, where the at least one face closing roller is configured to apply sufficient force to the first tower face plate to press the snap gland of the first snap-fit fastener, preferably located on the first tower plate, into a corresponding snap gland receptacle, preferably located on the tower body. The alignment system may include at least one set of tower body alignment rollers, the at least one set of tower body alignment rollers including a first tower body alignment roller and a second tower body alignment roller, where the first tower body alignment roller is located on a first side of the tower body and configured to locate and align the first side of the tower body as the at least one face closing roller latches the first tower face plate to the tower body with the first snap-fit fastener, and where the second tower body alignment roller is located on a second side of the tower body and configured to locate and align the second side of the tower body as the at least one face closing roller latches the first tower face plate to the tower body with the first snap-fit fastener. The alignment system may include a plurality of alignment rollers configured as alignment roller pairs, where one of the alignment rollers of each alignment roller pair is configured to contact the tower body within the first modified V-shaped groove and a second one of the alignment rollers of each alignment roller pair is configured to contact the tower body within the second modified V-shaped groove.

In another aspect, the multi-piece hydroponic tower may be a dual-sided hydroponic tower with the tower body defining first and second tower cavities. In this configuration the first body hinge member of the first edge portion of the tower body corresponds to the first tower cavity. A second tower body hinge member of a second edge portion of the tower body corresponds to the second tower cavity. The dual-sided hydroponic tower further comprises (i) a second tower face plate, where an edge portion of the second tower face plate includes a second face plate hinge member, where the second tower face plate is hingeably coupled to the tower body via the second tower body hinge member and the second face plate hinge member, where the second tower face plate is positionable relative to the tower body in at least a second tower cavity closed position and a second tower cavity open position, and where the second tower face plate includes a second plurality of plant container cut-outs configured to accept a second plurality of plant containers; and (ii) a second fastener configured to temporarily latch the second tower face plate to the tower body when the second tower face plate is in the second tower cavity closed position. The tower closing system is further configured to (a) move the second tower face plate from the second tower cavity open position to the second tower cavity closed position, and (b) latch the second tower face plate to the tower body with the second fastener. In this dual-sided configuration, preferably the first modified V-shaped groove is centered between the first tower cavity and the second tower cavity, and the second modified V-shaped groove is centered between the first tower cavity and the second tower cavity. The first inner groove wall may be substantially parallel to the first side of the tower body and substantially perpendicular to the first tower cavity rear wall, and the second inner groove wall may be substantially parallel to the second side of said tower body and substantially perpendicular to the second tower cavity rear wall.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. The same reference label on different figures should be understood to refer to the same component or a component of similar functionality. Additionally, multiple labels using the same numerical label and differing only in the letter label (e.g., 1401A and 1401B) refer to components of the same or similar functionality but located in different locations within the device (e.g., left and right configured components that are of the same general design and perform the same general function).

DESCRIPTION OF THE SPECIFIC EMBODIMENTS

Figure 1:
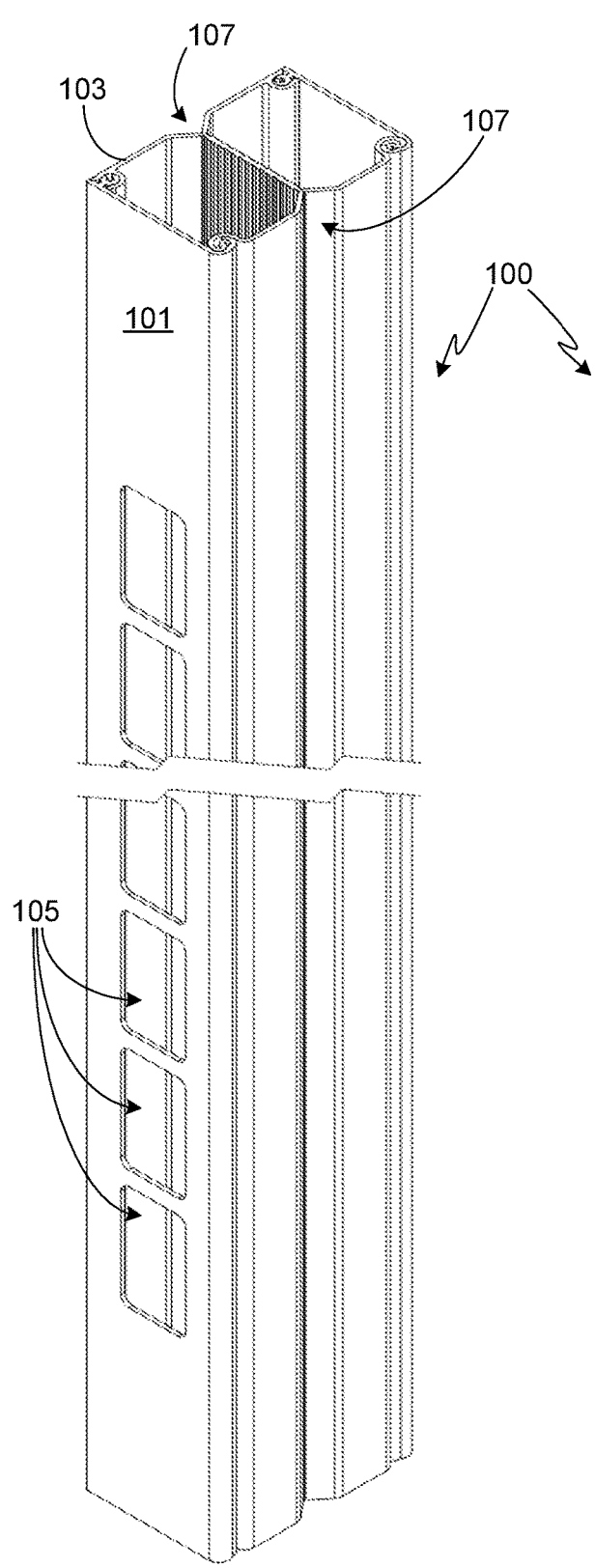
FIG. 1 provides a perspective view of an exemplary dual-sided, multi-piece hydroponic tower with hingeably coupled front face plates, this view showing the face plates in the closed position.

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

In accordance with the invention, an apparatus is disclosed that provides a means for automatically closing the face of a hinged hydroponic tower. This system can be used, for example, after the hinged hydroponic tower has been opened (e.g., unhinged) and cleaned. An opening system that can be used with a hinged hydroponic tower is described in co-pending and co-assigned U.S. patent application Ser. No. 16/376,878, filed 6 Apr. 2019, the disclosure of which is incorporated herein for any and all purposes. The inventors have found that by keeping the face plates attached to the tower body via a hinge, part alignment is simplified and it is easier to ensure that a specific face plate is properly associated with the appropriate tower body and, assuming a double-sided tower body, that each face plate is properly associated with the appropriate side of a specific tower body.

As described in detail below, the tower closing apparatus is comprised of several primary components: (i) an alignment system that ensures that the tower maintains proper alignment as it passes through the closing apparatus; (ii) a drive system that forces the tower through the apparatus; (iii) guides that control the face closing operation; and (iv) closing members that force the closure of the tower face(s) to the tower body.

The hydroponic tower closing apparatus of the invention can be configured to work with a variety of tower designs, typically by altering the location of the various alignment, drive and guide members in order to take into account the dimensions of the intended hydroponic tower, and by altering the location of the closing members to account for the specific type of fastener coupling the tower face to the tower body. In order to clarify operation of the disclosed closing apparatus, the invention is illustrated using the dual-sided, multi-piece hydroponic tower described in co-pending and co-assigned U.S. patent application Ser. No. 15/968,425, filed 1 May 2018, the disclosure of which is incorporated herein for any and all purposes. It should be understood, however, that the present invention may also be configured for use with a single-sided, multi-piece hydroponic tower such as that disclosed in U.S. patent application Ser. No. 15/968,425, as well as other hydronic tower designs, and therefore the description and illustrated embodiments contained herein should not be viewed as limiting the disclosed closing apparatus to a particular hydroponic tower.

Figure 2:
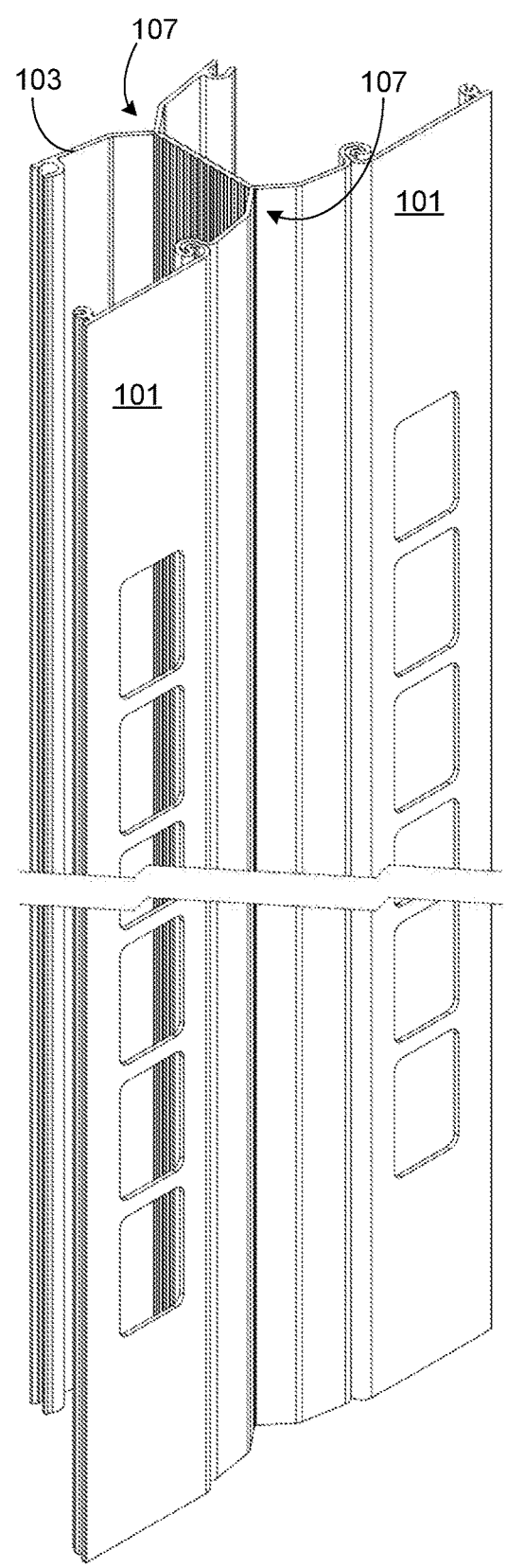
FIG. 2 provides a perspective view of the dual-sided, multi-piece hydroponic tower shown in FIG. 1, this view showing the face plates in the open position.

FIGS. 1 and 2 provide perspective views of an exemplary dual-sided, multi-piece hydroponic tower 100 in which each front face plate 101 is hingeably coupled to the tower body 103, this configuration being described in detail in U.S. patent application Ser. No. 15/968,425. In FIG. 1 each front face plate 101 is in the closed position while in FIG. 2 face plates 101 are shown in the open position. Although any of a variety of materials can be used in the manufacture of the tower, preferably the tower is fabricated from plastic (e.g., polyethylene, polypropylene, polyvinyl chloride (PVC), polytetrafluoroethylene, acrylonitrile butadiene styrene (ABS), etc.). In at least one embodiment, the tower body is fabricated from a PVC plastic and the tower face plates are fabricated from an ABS plastic. Preferably the materials used to fabricate the tower are opaque in order to prevent light from entering the tower, thus helping to minimize algae growth. Additionally, in at least one configuration the tower materials are white, thereby increasing the amount of light reflected back onto the plants.

In FIGS. 1 and 2, tower 100 includes a plurality of cut-outs 105. Each cut-out 105 is sized to accommodate a plant plug holder (not shown in FIGS. 1 and 2). A variety of designs and configurations may be used for the individual plant plug holders. Exemplary plant plug holders are described in detail in co-assigned and co-pending U.S. patent application Ser. No. 15/910,445, filed 2 Mar. 2018, and U.S. patent application Ser. No. 15/910,796, filed 2 Mar. 2018, the disclosures of which are incorporated herein for any and all purposes. It should be understood, however, that the tower closing apparatus disclosed in the present application is not limited to use with a particular plant plug holder. As such, cut-outs 105 are only meant to illustrate, not limit, the present tower design and it should be understood that the present invention is equally applicable to hinged hydroponic towers utilizing other cut-out designs.

Figure 3:
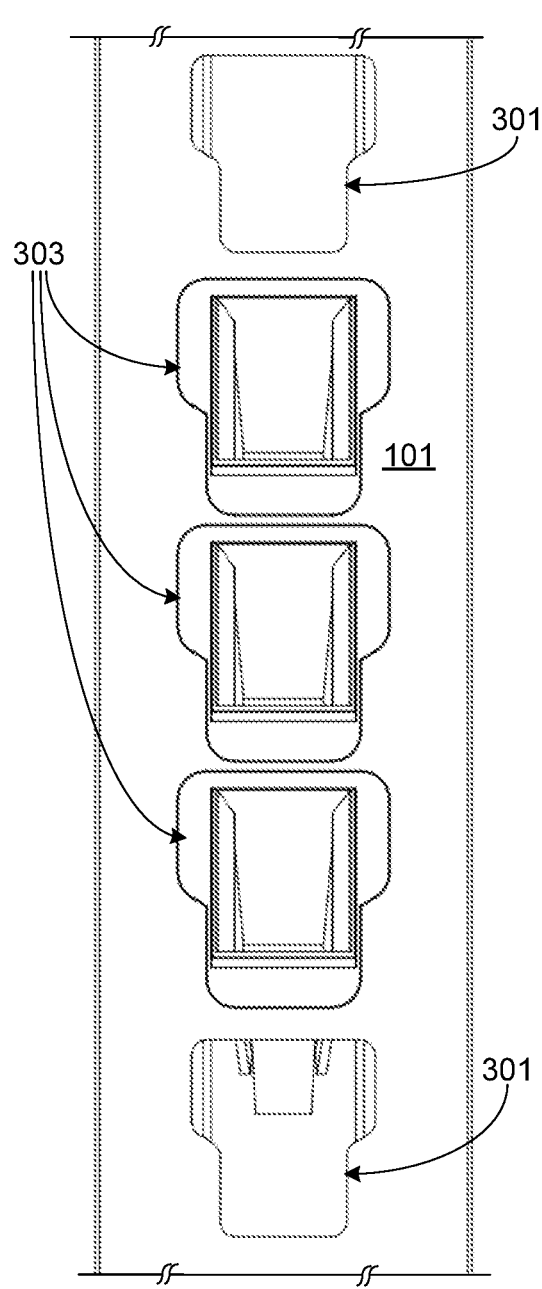
FIG. 3 provides a front planar view of a portion of a hydroponic tower containing several plant plug holders.
Figure 4:
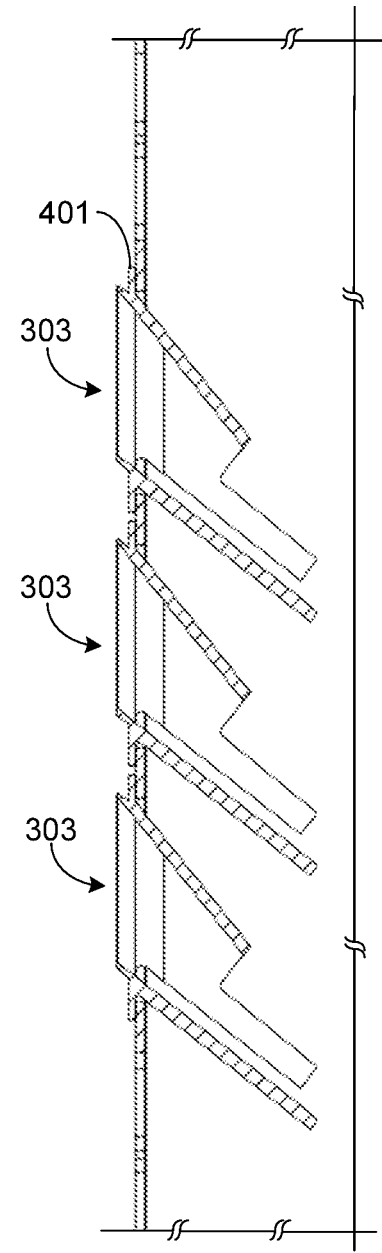
FIG. 4 provides a side cross-sectional view of the tower assembly shown in FIG. 3.
Figure 5:
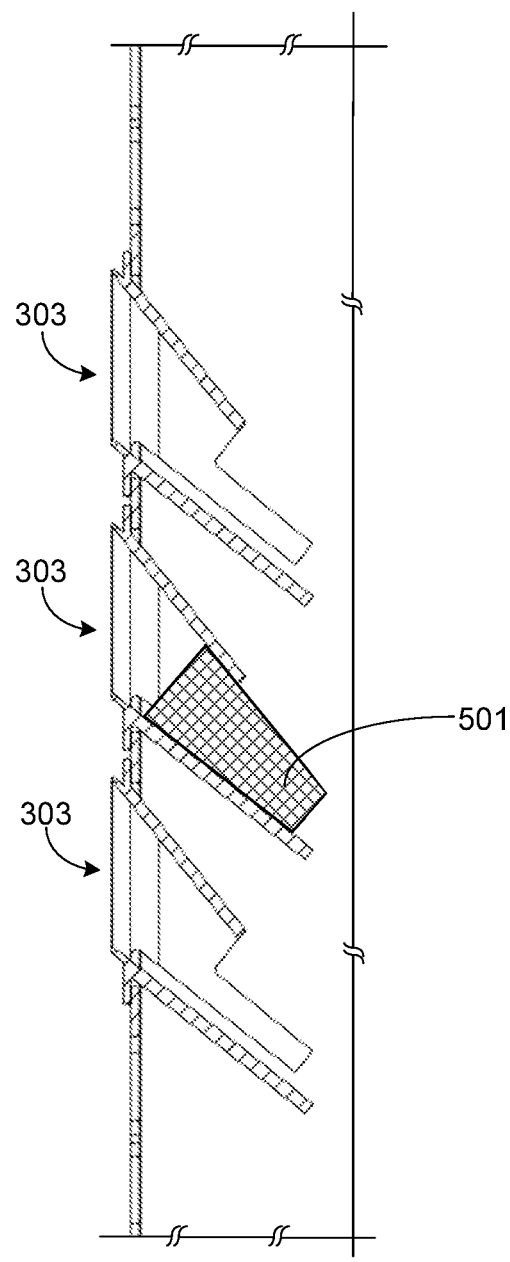
FIG. 5 provides the same view as that shown in FIG. 4, with the inclusion of a plant plug within one of the plant plug holders.

FIG. 3 provides a front planar view of a portion of a hydroponic tower assembly utilizing an alternate cut-out design 301. Note that in this view, plant plug holders 303 are only inserted within the three middle cut-outs 301. In this illustration, uppermost and lowermost cut-outs 301 are open. FIG. 4 provides a vertical cross-sectional view of the portion of the tower assembly shown in FIG. 3. FIG. 5 provides the same cross-sectional view as that shown in FIG. 4, with the addition of a plant plug 501 within the middle plant plug holder 303. Note that in FIG. 5 only the plant plug is shown, i.e., there is no seedling or mature plant contained within plug 501. Additionally, note that FIGS. 4 and 5 only illustrate one side of a dual-sided hydroponic tower such as the tower shown in FIGS. 1 and 2.

The plant plug holders used with the invention are preferably fabricated from plastic (e.g., polyethylene, polypropylene, polyvinyl chloride (PVC), polytetrafluoroethylene, acrylonitrile butadiene styrene (ABS), etc.), for example using injection molding. As with the tower face plates, preferably the plant plug holders are manufactured using an opaque plastic (e.g., ABS) that is colored white to minimize algae growth within the tower and increase reflected light.

Typically the plant plug holders, e.g., holders 303, are attached to tower face 101 via edge member 401, where edge member 401 encircles the plant container closing as shown. Edge member 401 extends out and away from the sides of the plug holder, thereby allowing the back surface of the edge member to be sealed to the tower face. While the plug holder does not have to be sealed to the tower face, sealing is preferred in order to inhibit leaking between the two components. Preferably the seal completely circumscribes the plant container closing. Although a variety of techniques can be used to seal the two components together, preferably they are either bonded together (e.g., solvent bonding) or welded together (e.g., ultrasonic welding).

In tower 100, a large "V" shaped groove 107 runs along the length of the tower, and on either side of the tower as shown in FIGS. 1 and 2. Preferably groove 107 is centered on the side of tower, evenly splitting the two tower cavities. If the present invention is used with a single-sided tower, preferably the tower still includes a groove, thereby providing a simplified means for tower alignment. While the invention can be used with a tower that utilizes a V-shaped groove, preferably a modified V-shaped groove shape is employed as illustrated in FIGS. 6 and 7.

Figures 6, 7:
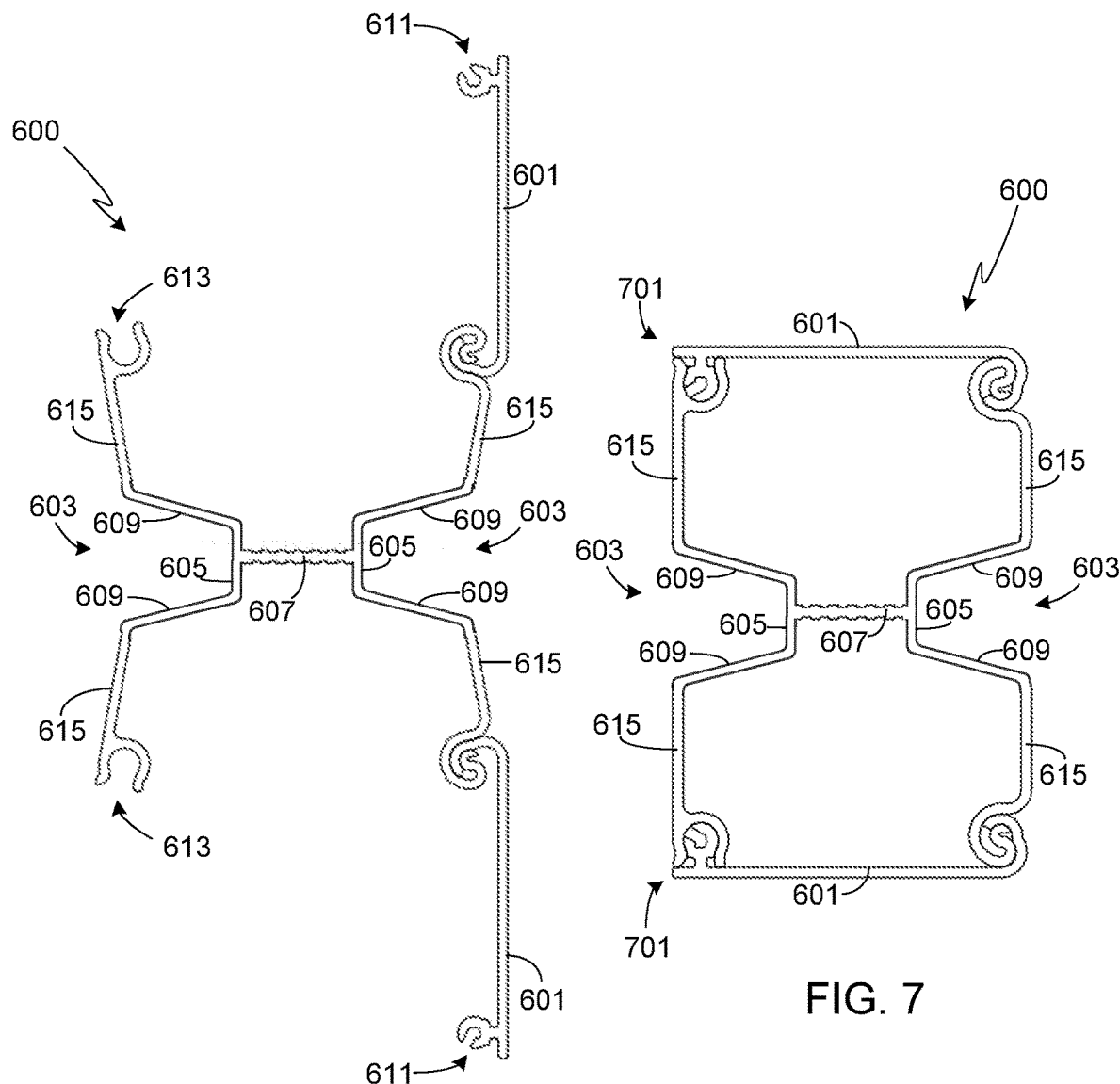
FIG. 6 provides a cross-sectional view of a preferred configuration for a multi-piece tower assembly for use with the invention, this view showing both face plates in the open position.
FIG. 7 provides a cross-sectional view of the preferred configuration for the multi-piece tower assembly shown in FIG. 6, this view showing both face plates in the closed position.

FIGS. 6 and 7 provide cross-sectional views of a multi-piece, hinged tower 600, this configuration preferred for use with the closing apparatus of the invention. In FIG. 6 face plates 601 are shown in an open position while in FIG. 7 the face plates are shown in a closed position. Preferably both the body portion and the face plates are extruded, and features such as the plant container cut-outs are punched during the manufacturing process. As shown, the cross-section of tower 600 is slightly different from that of tower 100. Specifically, rather than a simple "V" shaped groove, modified V-shaped groove 603 includes an inner groove wall 605 which, due to rear tower cavity wall 607, exhibits improved rigidity in this region of the groove. Sloped groove walls 609 of modified groove 603 retain a V-shape as in the previously described and illustrated tower grooves. The hinged tower faces 601 are substantially the same, if not identical, to the tower faces 101 of tower 100 and operate in the same manner as those described in U.S. patent application Ser. No. 15/968,425. In the preferred embodiment, each face plate is attached to the body of the hydroponic tower using snap-fit fasteners 701.

Figure 8:
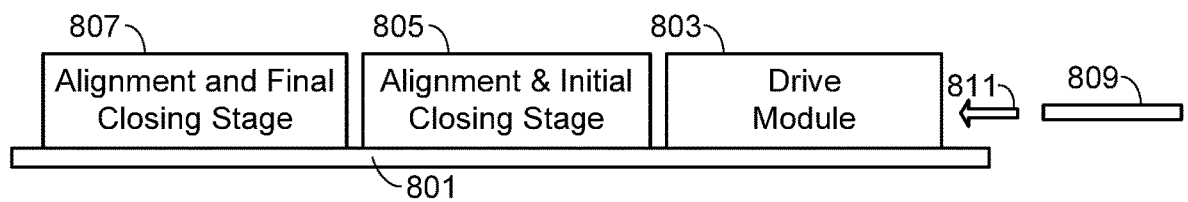
FIG. 8 provides a diagram of the basic operational units of the closing apparatus in accordance with a preferred embodiment of the invention.

FIG. 8 provides a diagram of the basic operational units of the closing apparatus in accordance with a preferred embodiment of the invention. Preferably the closing apparatus is washdown safe (i.e., built to IP65 or higher standards) in order to simplify cleaning and maintenance. In at least one embodiment, the operational units are attached to a mounting base 801, thus providing stability and rigidity to the overall structure and ensuring that the various components of the system remain aligned.

The first portion of the tower closing system is the drive unit 803. As described in detail below, the drive unit is designed to propel the hydroponic tower through the closing apparatus. The second portion 805 of the closing system is used to align the tower within the apparatus and to initiate closing of the face plates relative to the tower body. In at least one embodiment, constraining rollers limit the degree to which the tower faces are allowed to close relative to the tower body during this stage of operation. The third portion 807 of the closing system, which includes additional alignment rollers, finalizes the tower closing operation by properly locating the tower faces relative to the tower body and closing the fasteners that hold the tower faces in place. Note that in this configuration, an open tower assembly 809 enters the closing system from the right and passes through the system in a direction 811.

In the preferred embodiment of the invention, drive rollers are pressed against the face of wall 605 of the modified V-shaped groove that runs the length of the tower body. Preferably the drive rollers are implemented in pairs with one drive roller coupled to a motor and the second drive roller coupled to a tensioner. Alternately, both drive rollers may be coupled to a motor.

Figure 9:
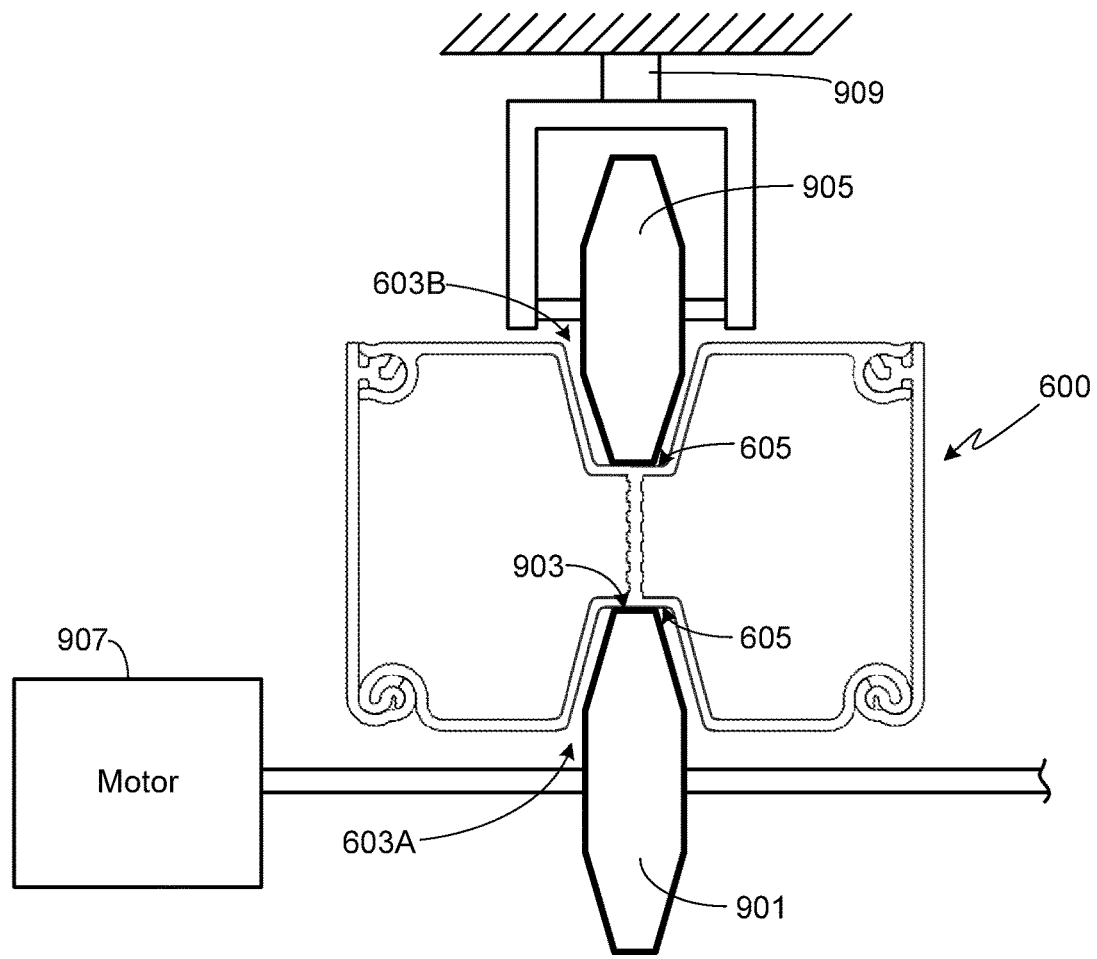
FIG. 9 illustrates the drive unit of the tower closing system of the invention, this figure providing a simplified cross-sectional view of the multi-piece tower assembly shown in FIG. 7 along with a pair of drive rollers.

As shown in the cross-sectional view provided in FIG. 9, assuming a dual-sided tower that utilizes the modified V-shape groove 603 shown in FIGS. 6 and 7, a drive roller 901 fits within one of the tower's grooves 603 such that the face 903 of drive roller 901 presses against wall 605 of groove 603A. Preferably face 903 of drive roller 901 is substantially flat, thereby providing greater contact area with wall 605 of the groove. A second drive roller 905 presses against wall 605 of groove 603B, where grooves 603A and 603B are complimentary modified V-shaped grooves located on either side of the tower body. One of the drive rollers (e.g., drive roller 901) is coupled to a drive motor 907 while the second drive roller (e.g., drive roller 905) is preferably not driven and is used to apply pressure against the tower, thus ensuring that the drive wheel coupled to the motor remains in contact with wall 605 of the groove and that rotation of the motorized drive wheel forces forward movement of the tower through the tower closing apparatus. The second drive roller is preferably coupled to a tensioner 909 (e.g., pneumatic or spring coupler) in order to ensure that sufficient force is applied by the second drive roller, thereby forcing the tower against the motorized drive roller. The motorized drive roller, and in some embodiments both drive rollers, is fabricated from a material with a relatively high coefficient of friction. Typically a polyurethane material is used for the motorized drive roller, and in some cases for both drive rollers, with a kinetic coefficient of friction that is preferably greater than 1. In some applications a material with a high coefficient of friction (e.g., polyurethane, rubber, etc.) is applied to the outer layer of the drive roller(s).

Figure 10:
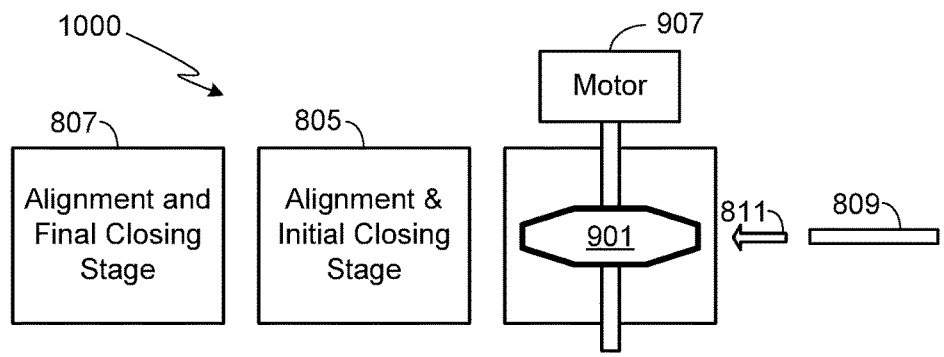
FIG. 10 provides a simplified top-down view of a first configuration for the drive unit of the invention.
Figure 11:
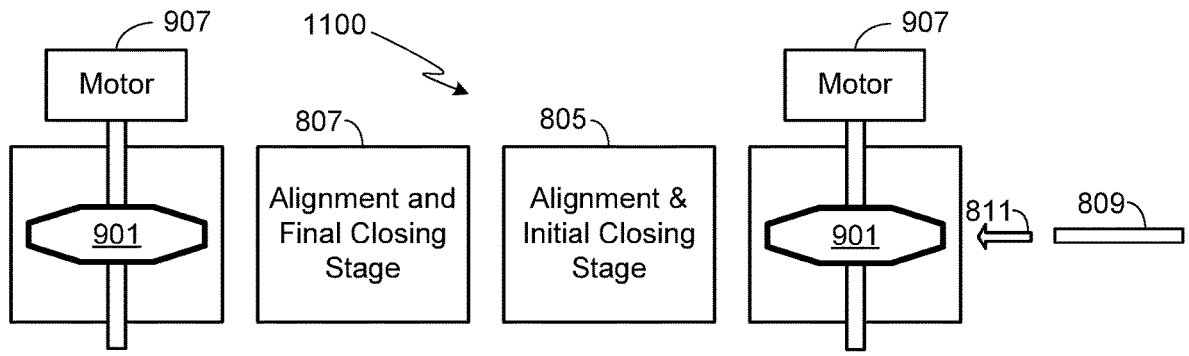
FIG. 11 provides a simplified top-down view of a second configuration for the drive unit of the invention.
Figure 12:
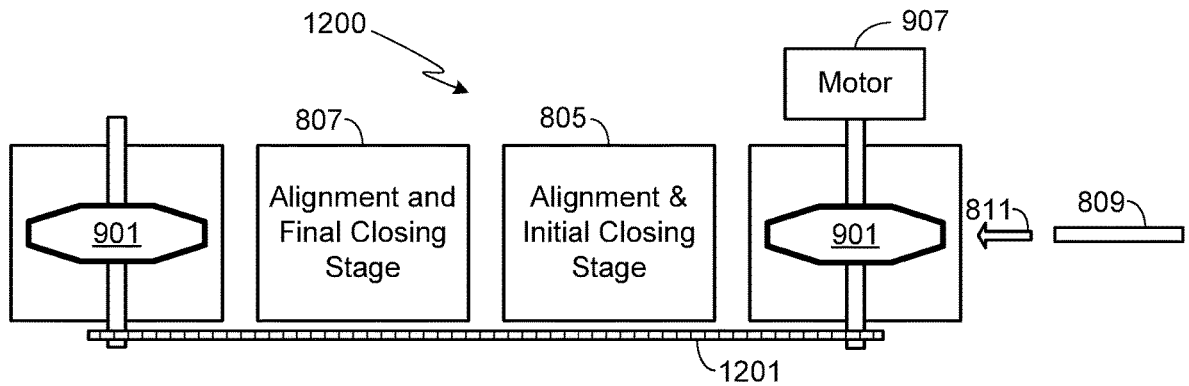
FIG. 12 provides a simplified top-down view of a third configuration for the drive unit of the invention.

As previously noted, while utilizing the basic operational units of the tower closing system, the present invention can be modified to accommodate various tower configurations, thus allowing the system to be used with hydroponic towers of different dimensions, different alignment groove configurations, various hinge mechanisms and both dual and single-sided towers. FIGS. 10-12 provide simplified top-down views of three different configurations for the drive unit of the invention, each using drive rollers as described above and illustrated in FIG. 9. Exemplary configuration 1000 uses a single drive unit located at the entrance to the closing apparatus. Exemplary configurations 1100 and 1200 utilize dual drive units, one located at the entrance to the closing apparatus and one located at the apparatus exit. In configuration 1100, each drive unit is coupled to its own motor 907. In configuration 1200, a single motor is coupled to both drive units, one directly and one indirectly via a belt drive 1201. Preferably belt drive 1201 utilizes a metal chain belt, an elastomer v- or multi-ribbed belt, or a polyurethane v- or multi-ribbed-belt.

As described in detail below, located throughout the closing apparatus are alignment rollers that ensure that the tower remains correctly aligned as it passes through the closing apparatus. In some locations within the apparatus, the alignment rollers are positioned in pairs, where each pair includes an alignment roller located on one side of the tower (e.g., above the tower) and a complimentary alignment roller located on the opposing tower side (e.g., below the tower). Utilizing complementary roller pairs, and preferably multiple complimentary roller pairs, enhances tower stability and alignment within the closing apparatus. As noted below, in some locations within the closing apparatus an alignment roller is used individually, i.e., not within a pair. When used singularly, the individual alignment roller is typically located near another component of the closing apparatus (e.g., a face manipulation roller, a closing roller), the alignment roller providing additional stability as the tower passes the other component.

Figure 13:
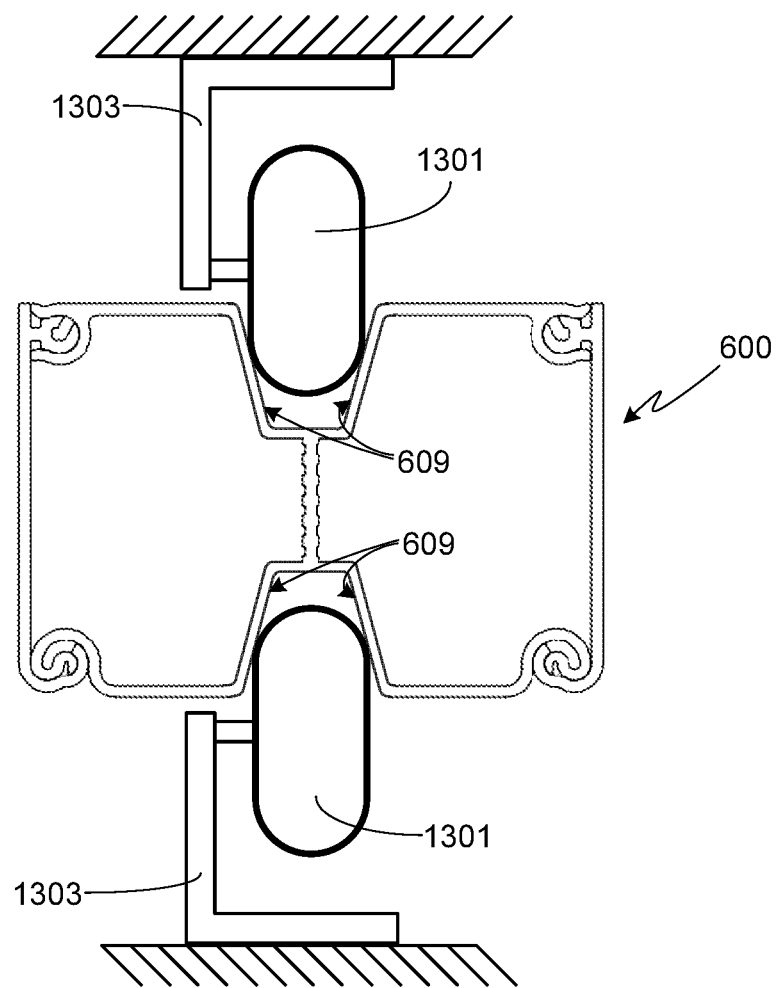
FIG. 13 illustrates a pair of alignment rollers relative to the multi-piece tower assembly shown in FIG. 7, this figure providing a simplified cross-sectional view of the assembly.

In the preferred embodiment, and as illustrated in the cross-sectional view provided by FIG. 13, the alignment rollers 1301 fit within the modified V-shaped grooves that run the length and on either side of the tower. Preferably the alignment rollers 1301 have a more rounded profile than the drive rollers, thereby contacting the sloped side walls 609 of the groove rather than groove face 605. Although the alignment rollers 1301 may be coupled to pneumatic or spring couplers in order to force contact between the roller surfaces and the tower grooves, the inventors have found that active roller mountings are not required and that the alignment rollers can be mounted using static mounts 1303 as shown. In general, the alignment rollers are mounted on axles which are supported by pillow blocks. The axles can also be supported by shaft mounts, or the wheels can be supported by shoulder bolts in a plate or similar mount. As rollers 1301 only perform the function of tower alignment, not tower motion, the inventors have found that the material used to fabricate the rollers is not critical. Preferably a plastic material, for example a thermoplastic such as Delrin®, is used to fabricate the alignment rollers.

Although not preferred, the inventors have envisioned the use of other alignment strategies with the tower. For example, one or more sides of the tower can be held in place using plates (e.g., nylon plates) or a combination of rollers and plates.

The second primary operational unit of the closing system ensures tower alignment and initiates the closing of the hinged tower face(s) to the tower body. Assuming the use of a dual-sided hydroponic tower as preferred, preferably the two hinged tower faces are simultaneously closed as described and illustrated below.

Figure 14:
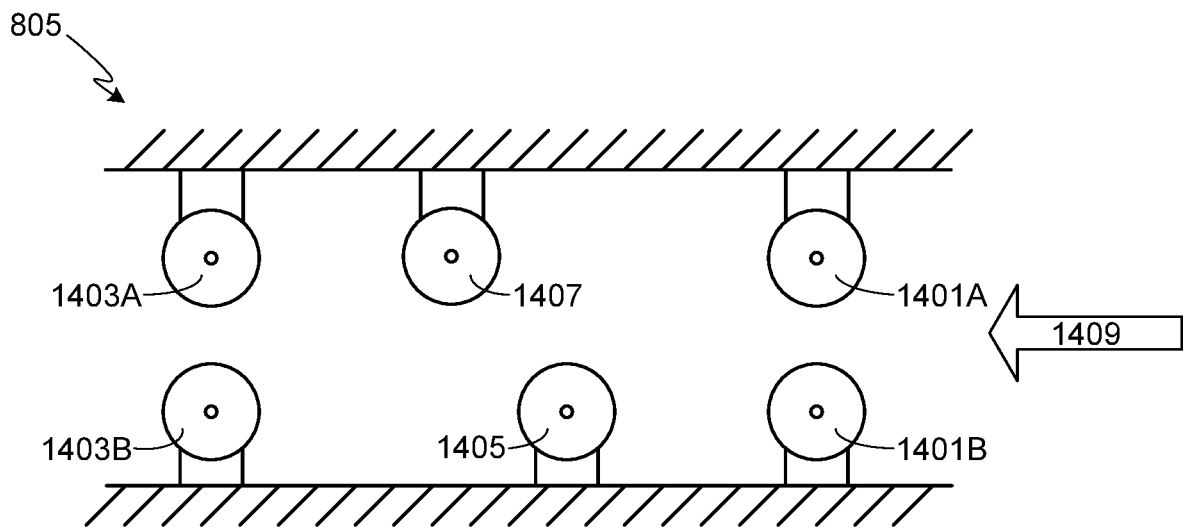
FIG. 14 provides a simplified cross-sectional view of the alignment rollers used in a preferred embodiment of the closing initiation stage of the tower closing apparatus.

FIG. 14 provides a simplified cross-sectional side view of the alignment portion of the second operational stage 805. In this embodiment there is a pair of alignment rollers at the beginning of the closing initiation stage (e.g., rollers 1401A/1401B) and a pair of alignment rollers at the completion of this stage (e.g., rollers 1403A/1403B). There is also a single alignment roller 1405 and a second single alignment roller 1407. As described below, alignment rollers 1405 and 1407 are preferably aligned with face manipulation rollers, thereby ensuring the tower remains in alignment as the tower faces are being manipulated. Note that in this embodiment, the drive unit(s) moves the tower through the closing apparatus in a direction 1409.

Figure 15:
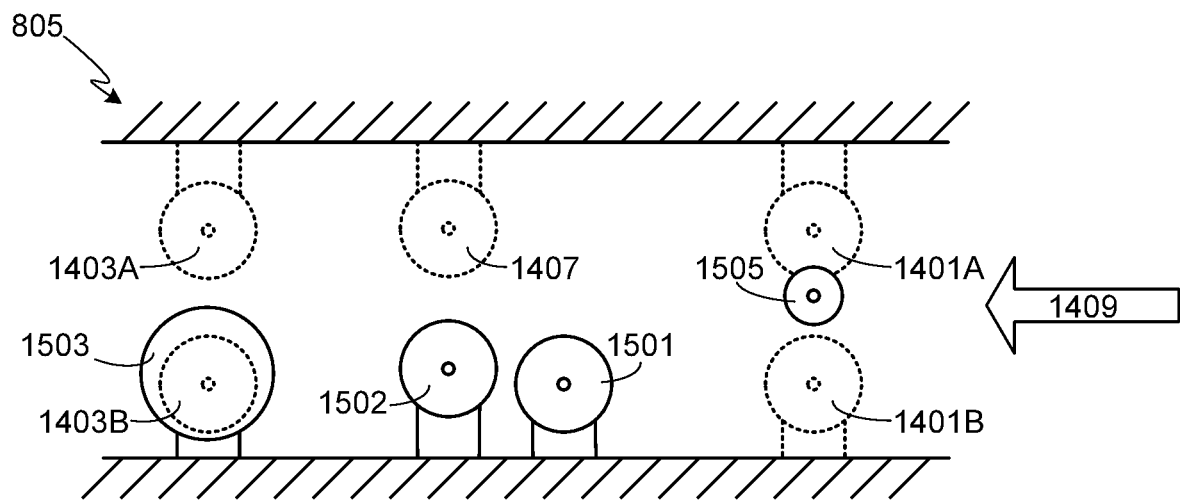
FIG. 15 provides the same view of the closing initiation stage as that shown in FIG. 14, this view including the face manipulation rollers.
Figure 16:
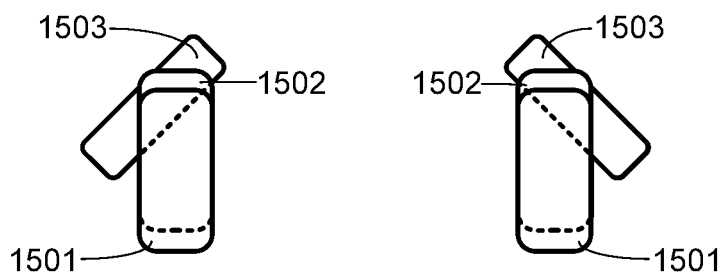
FIG. 16 provides a simplified end view of the face manipulation rollers shown in FIG. 15.

FIG. 15 provides a similar view of operational stage 805 as that shown in FIG. 14, with the alignment rollers shown in phantom. FIG. 15 also illustrates the three face manipulation rollers 1501-1503 which are used to gradually move the tower face(s) from the fully open position to a partially closed position. FIG. 16 provides an end view of face manipulation rollers 1501-1503. Note that in FIG. 15 alignment roller 1405 is not visible since it is aligned with face manipulation roller 1501. Additionally, alignment roller 1403B, shown in phantom, is completely hidden by face manipulation roller 1503.

The face manipulation rollers are positioned such that the uppermost surface of each roller gradually increases in height relative to the closing apparatus mounting base (e.g., base 801) as the distance from the entrance of the closing apparatus increases. As a result of this configuration, as the tower proceeds through the closing apparatus, the tower face plates are gradually moved from a fully open position to a partially closed position. In the preferred and illustrated embodiment, the axles of the first two face manipulation rollers (i.e., rollers 1501 and 1502) are parallel with the axles of the alignment rollers. The axle of the third face manipulation roller (i.e., roller 1503) is preferably set at 45 degrees relative to the alignment roller axles as shown in the figures.

Figure 17:
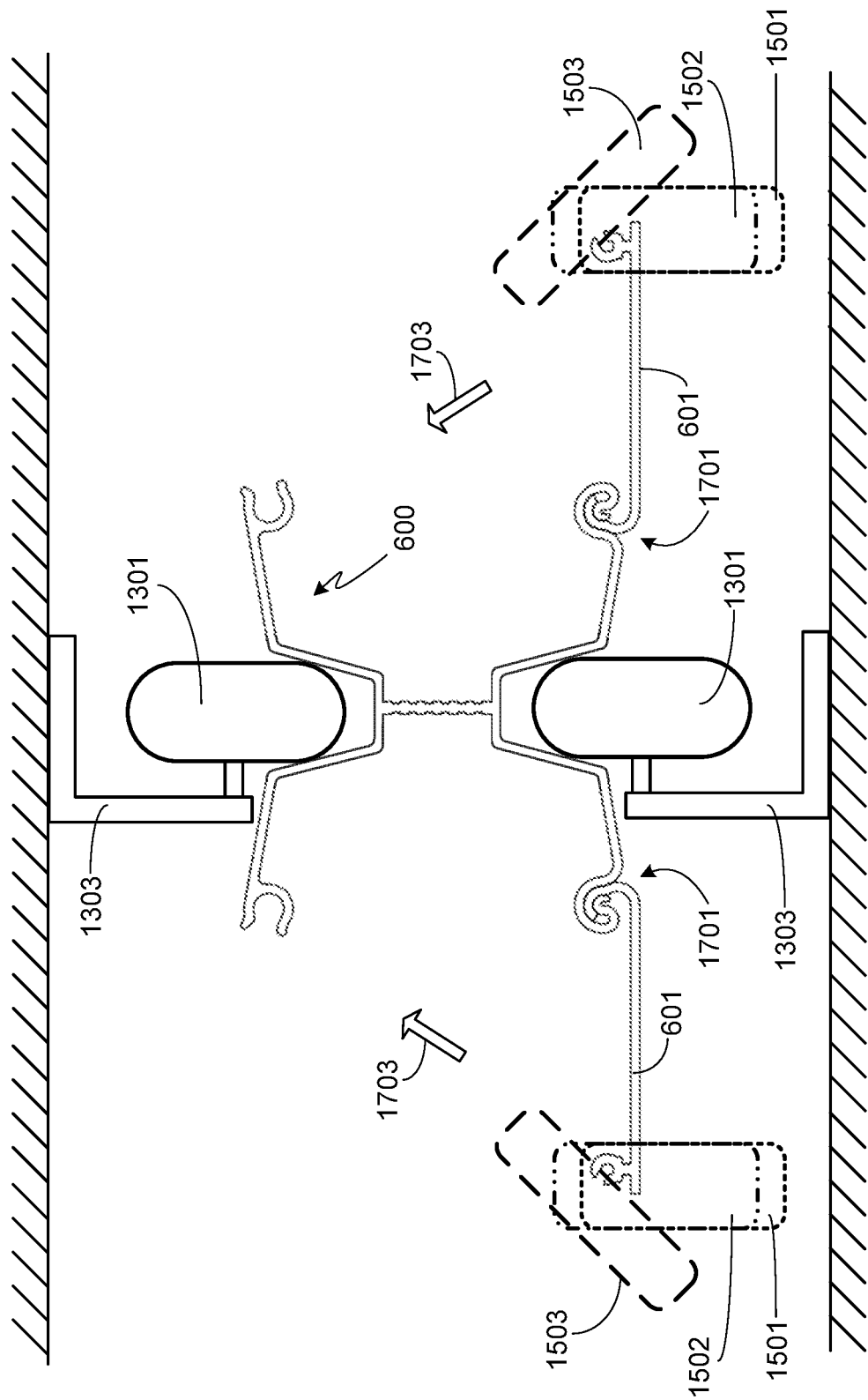
FIG. 17 provides an end view of the primary components of the closing initiation stage relative to the multi-piece tower assembly shown in FIG. 6, this view emphasizing the face manipulation rollers.

FIG. 17 provides a simplified end view of the alignment and initial closing stage 805 relative to the dual-sided, multi-piece hinged tower 600 shown in FIGS. 6 and 7, where tower 600 is shown with the face plates 601 in the fully open position. The face manipulation rollers are all shown in phantom in this figure. Although the tower faces 601 are shown in the fully open position, it should be understood that as the tower proceeds through the closing apparatus in direction 1409, the face manipulation rollers force each tower face 601 to rotate about hinge members 1701, thus moving in a generally upward and inward direction 1703.

Figure 18:
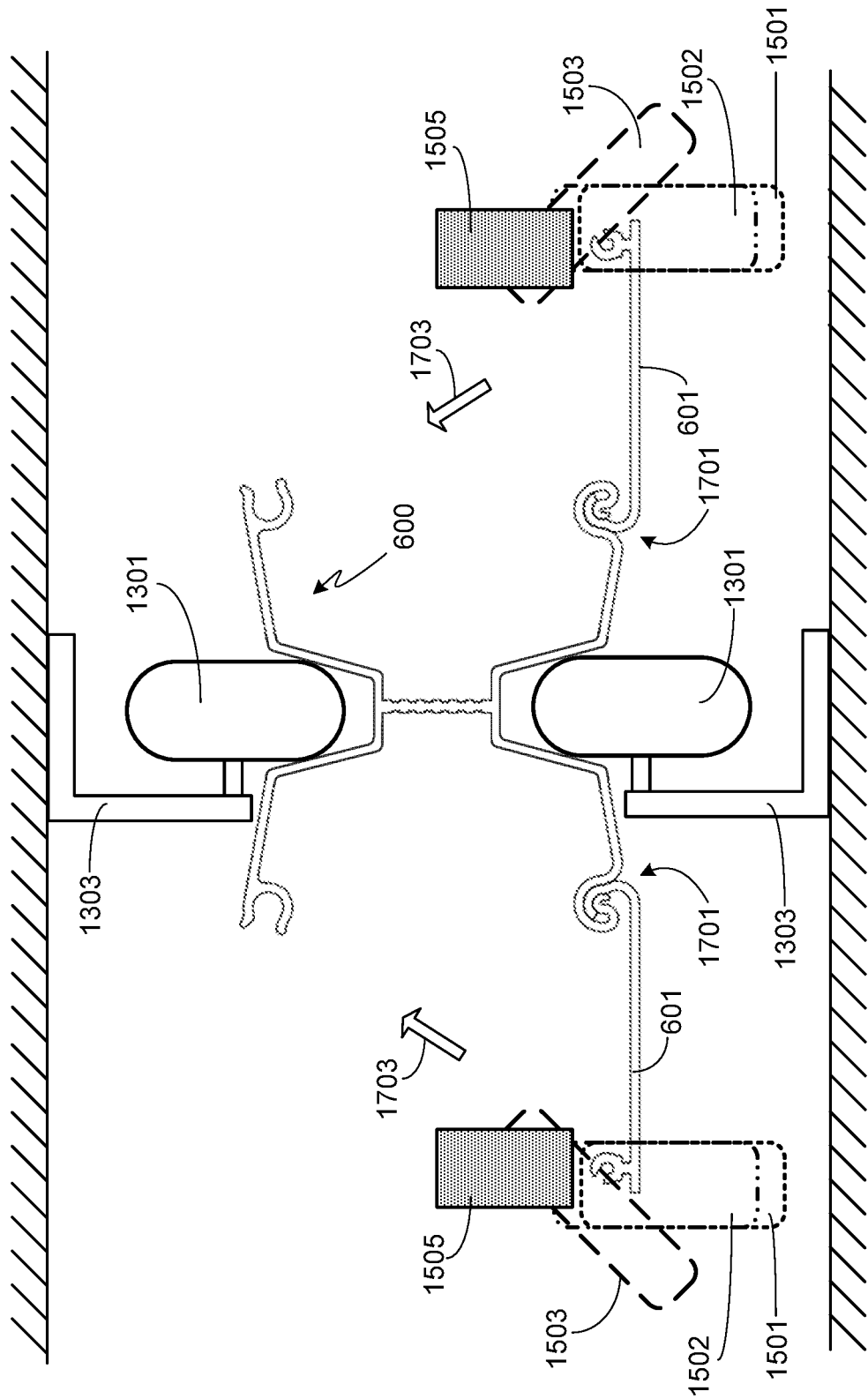
FIG. 18 provides a similar view as that shown in FIG. 17, this view including a set of face plate constraining rollers.

The inventors have found that in some configurations, especially configurations in which the plant plug holders are attached to the tower faces, the tower faces may close more quickly than desired. Premature face plate closing may lead to some tower components, such as the plant plug holders, interfering with the closing apparatus as the tower moves through the device. Accordingly in a preferred embodiment of the invention, an idler roller 1505, also referred to herein as a face plate constraining roller, is used to control the tower face closing process. Preferably as shown in FIGS. 15 and 18, a pair of idler rollers 1505 is located near the entrance to the closing apparatus, rollers 1505 preceding the first face manipulation roller 1501. As a result, once the face manipulation rollers begin to rotate the leading portion of the face plates upward and inward in a generally upward and inward direction 1703, idler rollers 1505 (also referred to as constraining rollers) control rotation of the face plates by limiting rotation of the rearward portion of each face plate.

Figure 19:
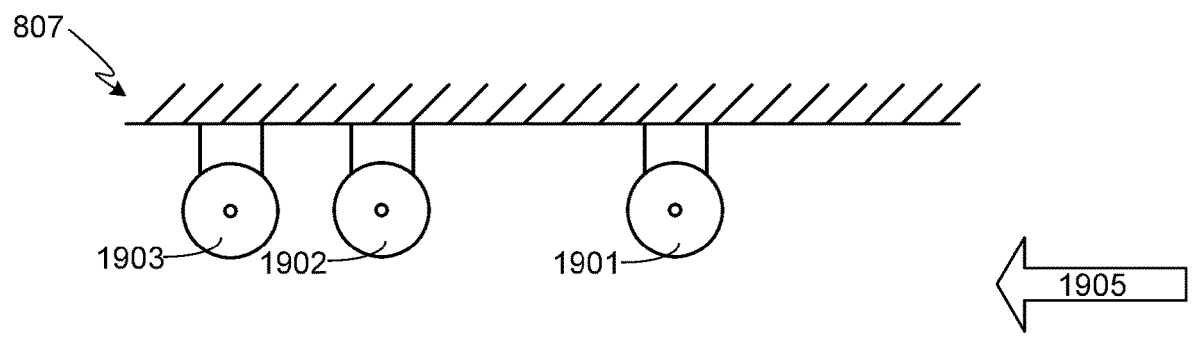
FIG. 19 provides a simplified cross-sectional side view of the alignment rollers used in a preferred embodiment of the third operational stage of the closing apparatus.
Figure 20:
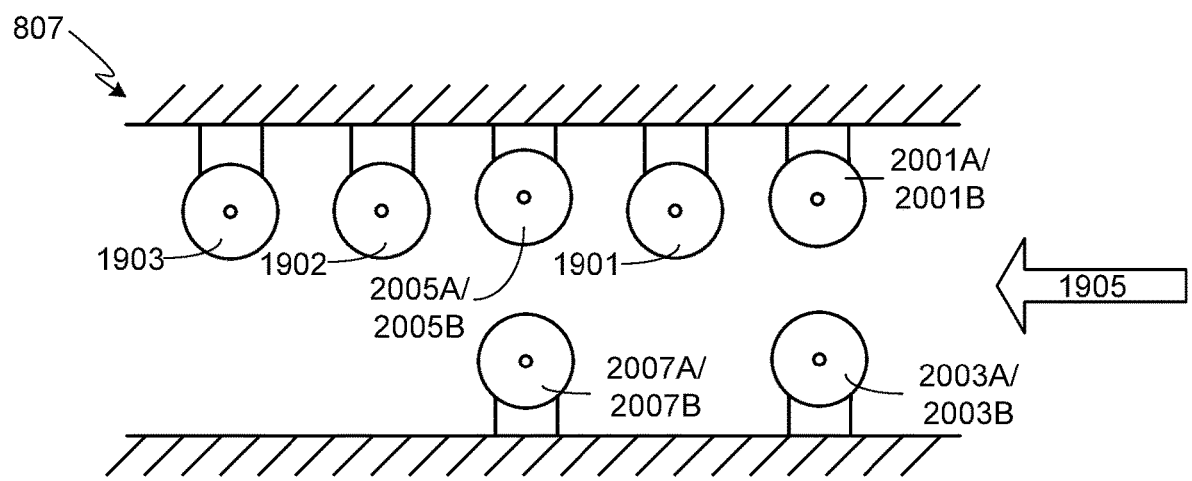
FIG. 20 provides the same view of the third stage of the closing apparatus as that shown in FIG. 19, this view including multiple sets of tower body alignment rollers.
Figure 21:
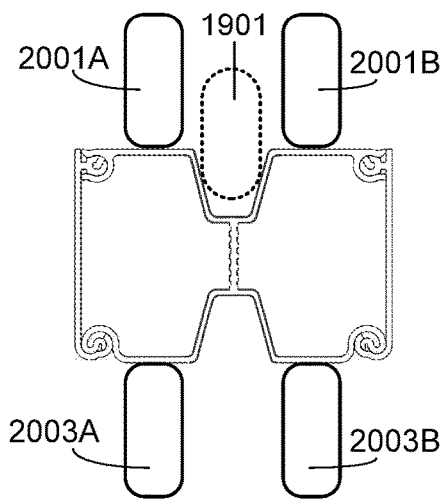
FIG. 21 provides a simplified end view of the third operational stage of the closing apparatus, this view illustrating the relative locations of the tower body alignment rollers.
Figure 22:
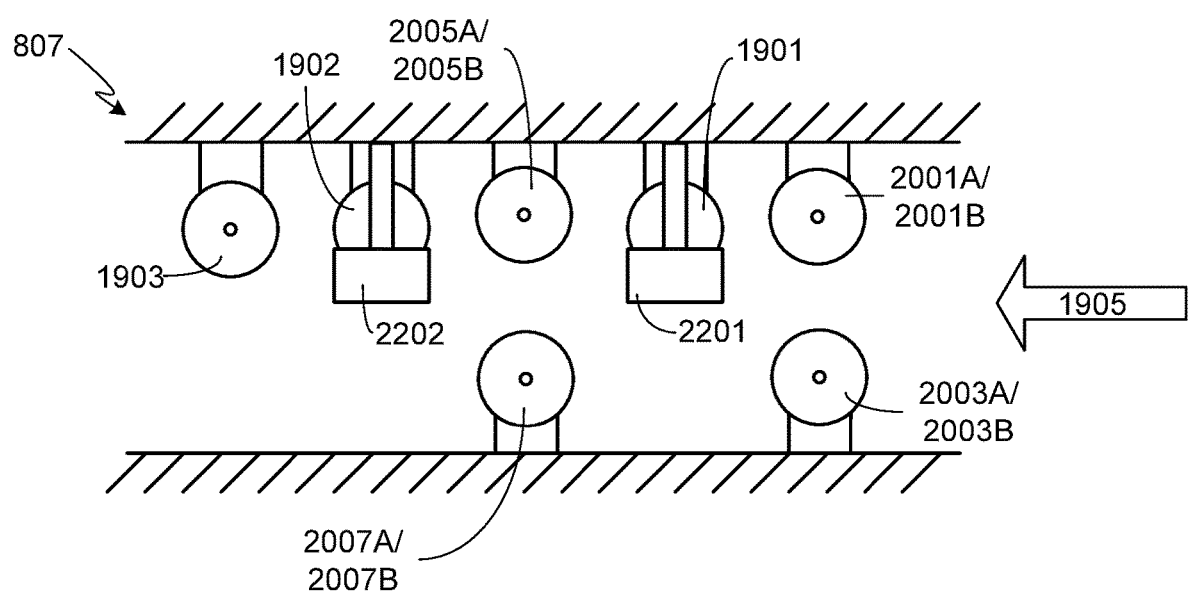
FIG. 22 provides the same view of the third stage of the closing apparatus as that shown in FIG. 20, this view including the face closing rollers.

FIG. 19-23 illustrate the third primary operational unit 807 of the closing system, this portion of the system completing the closing process by forcing the snap gland 611 of each tower face 601 into the corresponding snap gland receptacle 613. FIG. 19 provides a simplified cross-sectional side view of the third operational stage 807, this view only showing the alignment rollers 1901-1903. In the preferred embodiment of the invention, in this stage the alignment rollers only ride within the upper modified V-shaped groove of the tower. Preferably rollers 1901 and 1902 are aligned with closing rollers 2201 and 2202 as shown in FIG. 22. Note that the tower is moving through the closing apparatus in direction 1905.

FIG. 20 provides the same view as that shown in FIG. 19 with the addition of multiple sets of tower body alignment rollers. Each set of tower body alignment rollers is preferably comprised of two pairs of rollers, with one pair of rollers positioned on one side of the tower, and preferably above the tower as shown, and a second pair of rollers positioned on the opposite side of the tower, preferably below the tower as shown. Thus in FIG. 20, the first set of tower body alignment rollers consists of upper roller pair 2001A/2001B and lower roller pair 2003A/2003B. The second set of tower body alignment rollers consists of upper roller pair 2005A/2005B and lower roller pair 2007A/2007B. The tower body alignment rollers are configured to locate and align the upper and lower sides of the tower (assuming the tower is positioned within the closing apparatus as shown), preferably locating the tower side walls 615 at an approximately 90 degree angle relative to tower back wall 607. The sides of the tower must be properly located to ensure that the snap gland 611 is aligned with the corresponding snap gland receptacle 613. The tower body alignment rollers also ensure that as the snap gland 611 is being pressed into the corresponding snap gland receptacle 613, tower walls 615 to not twist or bow which could prevent the snap gland from properly seating within the snap gland receptacle.

FIG. 21 provides a simplified end view of a portion of stage 807, this view showing the preferred positioning of one set of tower body alignment rollers (e.g., rollers 2001A, 2001B, 2003A and 2003B) relative to the sides of the tower. For added clarity, the tower face plates are shown in the fully closed position with each snap gland located within the corresponding snap gland receptacle. Also for clarity, an alignment roller (e.g., roller 1901) is shown in phantom located within the upper modified V-shaped groove.

FIG. 22 provides the same view of the third operational stage 807 as that shown in FIG. 20, this figure adding the face closing rollers 2201 and 2202. Note that the axes of the face closing rollers are perpendicular to the axes of the alignment rollers and the tower body alignment rollers. The first face closing roller 2201 initiates the process of forcing snap gland 611 into the corresponding snap gland receptacle 613 by applying pressure in a direction 2301 (see FIG. 23) relative to the tower face plates. The second face closing roller 2202, which is positioned closer to the tower face plates than the first face closing roller 2201, ensures that the tower face plates are in the fully closed state prior to the tower exiting the closing apparatus by ensuring that the snap glands are completely seated within the corresponding snap gland receptacles.

Figure 23:
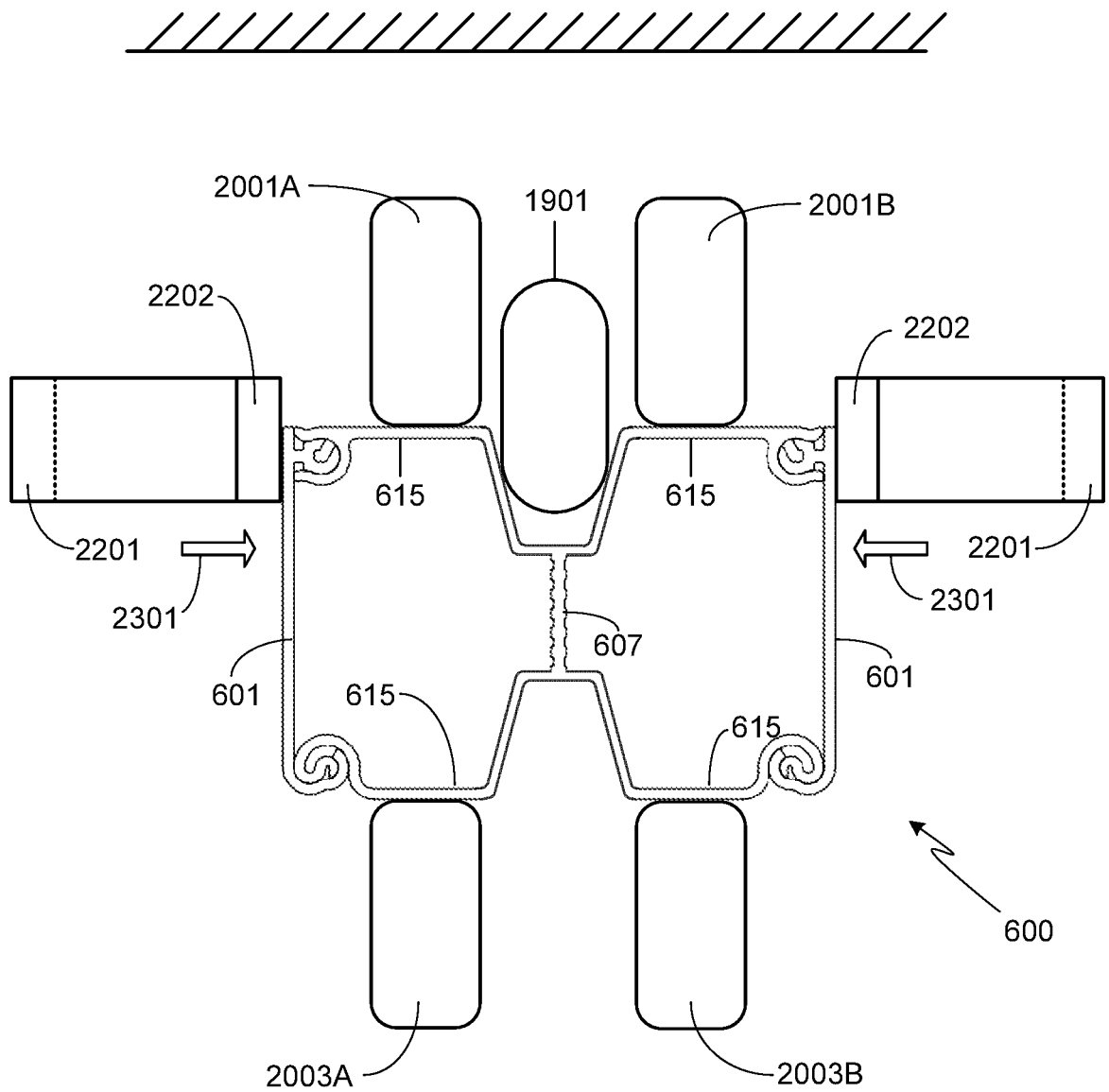
FIG. 23 provides an end view of the primary components of the final closing stage relative to the multi-piece tower assembly.

FIG. 23 provides a simplified end view of the alignment and final closing stage 807 relative to the dual-sided, multi-piece hinged tower 600 shown in FIGS. 6 and 7, where tower 600 is shown with the face plates 601 in the fully closed position. To simplify and thus clarify the figure, mounting hardware is not shown for alignment roller 1901, tower body alignment rollers 2001A, 2001B, 2003A and 2003B, and face closing rollers 2201 and 2203. Although the tower faces 601 are shown in the fully closed position, it should be understood that as the tower proceeds through the closing apparatus in direction 1409, the face closing rollers force tower faces 601 in a direction 2301, thus gradually closing the tower fasteners by pressing the snap glands 611 into the corresponding snap gland receptacles 613.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A hydroponic tower closing apparatus configured to close a multi-piece hydroponic tower, said multi-piece hydroponic tower comprising (i) a tower body, said tower body defining at least a first tower cavity, wherein a first edge portion of said tower body includes a first tower body hinge member, (ii) a first tower face plate, wherein an edge portion of said first tower face plate includes a first face plate hinge member, wherein said first tower face plate is hinge-ably coupled to said tower body via said first tower body hinge member and said first face plate hinge member, wherein said first tower face plate is positionable relative to said tower body in at least a first tower cavity closed position and a first tower cavity open position, said first tower face plate comprising a first plurality of plant container cut-outs configured to accept a first plurality of plant containers, and (iii) a first fastener configured to temporarily latch said first tower face plate to said tower body when said first tower face plate is in said first tower cavity closed position, said hydroponic tower closing apparatus comprising:
a drive system configured to propel said multi-piece hydroponic tower through said hydroponic tower closing apparatus;
an alignment system configured to align said multi-piece hydroponic tower body within said hydroponic tower closing apparatus; and
a tower closing system configured to (i) move said first tower face plate from said first tower cavity open position to said first tower cavity closed position, and (ii) latch said first tower face plate to said tower body with said first fastener, said tower closing system comprising a closing initiation stage and a closing finalization stage, wherein said closing initiation stage is configured to move said first tower face plate from said first tower cavity open position to a first tower face plate partially closed position, and wherein said closing finalization stage is configured to (i) move said first tower face plate from said first tower face plate partially closed position to said first tower cavity closed position and (ii) latch said first tower face plate to said tower body with said first fastener, said closing initiation stage comprising a plurality of face plate manipulation rollers configured to force said first tower face plate to rotate about said first tower body hinge member and to gradually move said first tower face plate from said first tower cavity open position to said first tower face plate partially closed position, wherein said first tower face plate rides on top of said plurality of face plate manipulation rollers as said multi-piece hydroponic tower is propelled through said hydroponic tower closing apparatus, and wherein a height of each face plate manipulation roller of said plurality of face plate manipulation rollers gradually increases with increasing distance from an entrance of said hydroponic tower closing apparatus.

2. The hydroponic tower closing apparatus of claim 1, said closing initiation stage further comprising at least one idler roller configured to limit initial rotation of said first tower face plate about said first tower body hinge member.

3. The hydroponic tower closing apparatus of claim 2, said at least one idler roller located closer to said entrance of said hydroponic tower closing apparatus than said plurality of face plate manipulation rollers.

4. The hydroponic tower closing apparatus of claim 1, said alignment system comprising a plurality of alignment rollers located within said closing initiation stage and configured to maintain alignment of said multi-piece hydroponic tower body as said plurality of face plate manipulation rollers rotate said first tower face plate about said first tower body hinge member.

5. The hydroponic tower closing apparatus of claim 1, said closing finalization stage comprising at least one face closing roller configured to (i) move said first tower face plate from said first tower face plate partially closed position to said first tower cavity closed position and (ii) latch said first tower face plate to said tower body with said first fastener.

6. A hydroponic tower closing apparatus configured to close a multi-piece hydroponic tower, said multi-piece hydroponic tower comprising (i) a tower body, said tower body defining at least a first tower cavity, wherein a first edge portion of said tower body includes a first tower body hinge member, (ii) a first tower face plate, wherein an edge portion of said first tower face plate includes a first face plate hinge member, wherein said first tower face plate is hingeably coupled to said tower body via said first tower body hinge member and said first face plate hinge member, wherein said first tower face plate is positionable relative to said tower body in at least a first tower cavity closed position and a first tower cavity open position, said first tower face plate comprising a first plurality of plant container cut-outs configured to accept a first plurality of plant containers, and (iii) a first fastener configured to temporarily latch said first tower face plate to said tower body when said first tower face plate is in said first tower cavity closed position, said hydroponic tower closing apparatus comprising:
- a drive system configured to propel said multi-piece hydroponic tower through said hydroponic tower closing apparatus;
- an alignment system configured to align said multi-piece hydroponic tower body within said hydroponic tower closing apparatus; and
- a tower closing system configured to (i) move said first tower face plate from said first tower cavity open position to said first tower cavity closed position, and (ii) latch said first tower face plate to said tower body with said first fastener, said tower closing system comprising a closing initiation stage and a closing finalization stage, wherein said closing initiation stage is configured to move said first tower face plate from said first tower cavity open position to a first tower face plate partially closed position, and wherein said closing finalization stage comprises at least one face closing roller and is configured to (i) move said first tower face plate from said first tower face plate partially closed position to said first tower cavity closed position and (ii) latch said first tower face plate to said tower body with said first fastener, said alignment system comprising a plurality of alignment rollers located within said closing finalization stage and configured to maintain alignment of said multi-piece hydroponic tower body as said at least one face closing roller moves said first tower face plate to said first tower cavity closed position and latches said first tower face plate to said tower body with said first fastener.

7. The hydroponic tower closing apparatus of claim 6, said first fastener comprising a first snap-fit fastener, said at least one face closing roller configured to apply sufficient force to said first tower face plate to press a snap gland of said first snap-fit fastener into a corresponding snap gland receptacle.

8. The hydroponic tower closing apparatus of claim 7, said snap gland located on said first tower face plate and said snap gland receptacle located on said tower body.

9. The hydroponic tower closing apparatus of claim 7, said plurality of alignment rollers comprising a first tower body alignment roller and a second tower body alignment roller, said first tower body alignment roller located on a first side of said tower body and configured to locate and align said first side of said tower body as said at least one face closing roller latches said first tower face plate to said tower body with said first snap-fit fastener, and said second tower body alignment roller located on a second side of said tower body and configured to locate and align said second side of said tower body as said at least one face closing roller latches said first tower face plate to said tower body with said first snap-fit fastener.

10. A hydroponic tower closing apparatus configured to close a multi-piece hydroponic tower, said multi-piece hydroponic tower comprising (i) a tower body, said tower body defining at least a first tower cavity, wherein a first edge portion of said tower body includes a first tower body hinge member, (ii) a first tower face plate, wherein an edge portion of said first tower face plate includes a first face plate hinge member, wherein said first tower face plate is hingeably coupled to said tower body via said first tower body hinge member and said first face plate hinge member, wherein said first tower face plate is positionable relative to said tower body in at least a first tower cavity closed position and a first tower cavity open position, said first tower face plate comprising a first plurality of plant container cut-outs configured to accept a first plurality of plant containers, and (iii) a first fastener configured to temporarily latch said first tower face plate to said tower body when said first tower face plate is in said first tower cavity closed position, said multi-piece hydroponic tower further comprising:
- a first modified V-shaped groove running along the length of a first side of said tower body, said first modified V-shaped groove comprising a first inner groove wall, a first sloped groove wall coupling a first edge of said first inner groove wall to a first edge of said first side of said tower body, and a second sloped groove wall coupling a second edge of said first inner groove wall to a second edge of said first side of said tower body; and
- a second modified V-shaped groove running along the length of a second side of said tower body, said second modified V-shaped groove comprising a second inner groove wall, a third sloped groove wall coupling a first edge of said second inner groove wall to a first edge of said second side of said tower body, and a fourth sloped groove wall coupling a second edge of said second inner groove wall to a second edge of said second side of said tower body;

said hydroponic tower closing apparatus further comprising:
- a drive system configured to propel said multi-piece hydroponic tower through said hydroponic tower closing apparatus, said drive system further comprising a plurality of drive rollers, said plurality of drive rollers comprising at least a first drive roller and at least a second drive roller, wherein said first drive roller is coupled to a drive motor and configured to contact said tower body within said first modified V-shaped groove, wherein operation of said drive motor forces rotation of said first drive roller, wherein rotation of said first drive roller propels said multi-piece hydroponic tower through said hydroponic tower closing apparatus, wherein said second drive roller is not coupled to said drive motor, wherein said second drive roller is configured to contact said tower body within said second modified V-shaped groove;
- an alignment system configured to align said multi-piece hydroponic tower body within said hydroponic tower closing apparatus; and
- a tower closing system configured to (i) move said first tower face plate from said first tower cavity open position to said first tower cavity closed position, and (ii) latch said first tower face plate to said tower body with said first fastener.

11. The hydroponic tower closing apparatus of claim 10, said first inner groove wall substantially parallel to said first side of said tower body and substantially perpendicular to a first tower cavity rear wall, and said second inner groove wall substantially parallel to said second side of said tower body and substantially perpendicular to said first tower cavity rear wall.

12. The hydroponic tower closing apparatus of claim 10, wherein said second drive roller is mounted via a pneumatic coupler and configured to apply pressure to said tower body via said second inner groove wall of said second modified V-shaped groove.

13. The hydroponic tower closing apparatus of claim 10, wherein said second drive roller is mounted via a spring coupler and configured to apply pressure to said tower body via said second inner groove wall of said second modified V-shaped groove.

14. The hydroponic tower closing apparatus of claim 10, said tower closing system comprising a closing initiation stage and a closing finalization stage, said closing initiation stage comprising a plurality of face plate manipulation rollers configured to force said first tower face plate to rotate about said first tower body hinge member and gradually move said first tower face plate from said first tower cavity open position to a first tower face plate partially closed position, wherein said first tower face plate rides on top of said plurality of face plate manipulation rollers as said multi-piece hydroponic tower is propelled through said hydroponic tower closing apparatus, and wherein a height of each face plate manipulation roller of said plurality of face plate manipulation rollers gradually increases with increasing distance from an entrance of said hydroponic tower closing apparatus, said closing finalization stage comprising at least one face closing roller configured to (i) move said first tower face plate from said first tower face plate partially closed position to said first tower cavity closed position and (ii) latch said first tower face plate to said tower body with said first fastener.

15. The hydroponic tower closing apparatus of claim 14, said alignment system comprising a first plurality of alignment rollers located within said closing initiation stage and configured to maintain alignment of said multi-piece hydroponic tower body as said plurality of face plate manipulation rollers rotate said first tower face plate about said first tower body hinge member, said alignment system further comprising a second plurality of alignment rollers located within said closing finalization stage and configured to maintain alignment of said multi-piece hydroponic tower body as said at least one face closing roller moves said first tower face plate to said first tower cavity closed position and latches said first tower face plate to said tower body with said first fastener.

16. The hydroponic tower closing apparatus of claim 14, said closing initiation stage further comprising at least one idler roller configured to limit initial rotation of said first tower face plate about said first tower body hinge member, said at least one idler roller located closer to said entrance of said hydroponic tower closing apparatus than said plurality of face plate manipulation rollers.

17. The hydroponic tower closing apparatus of claim 14, said first fastener comprising a first snap-fit fastener, said at least one face closing roller configured to apply sufficient force to said first tower face plate to press a snap gland of said first snap-fit fastener into a corresponding snap gland receptacle.

18. The hydroponic tower closing apparatus of claim 17, said snap gland located on said first tower face plate and said snap gland receptacle located on said tower body.

19. The hydroponic tower closing apparatus of claim 17, said alignment system comprising at least one set of tower body alignment rollers, said at least one set of tower body alignment rollers comprising a first tower body alignment roller and a second tower body alignment roller, said first tower body alignment roller located on a first side of said tower body and configured to locate and align said first side of said tower body as said at least one face closing roller latches said first tower face plate to said tower body with said first snap-fit fastener, and said second tower body alignment roller located on a second side of said tower body and configured to locate and align said second side of said tower body as said at least one face closing roller latches said first tower face plate to said tower body with said first snap-fit fastener.

20. The hydroponic tower closing apparatus of claim 10, said alignment system further comprising a plurality of alignment rollers configured within said hydroponic tower closing apparatus as alignment roller pairs, wherein a first alignment roller of each alignment roller pair is configured to contact said tower body within said first modified V-shaped groove, and wherein a second alignment roller of each alignment roller pair is configured to contact said tower body within said second modified V-shaped groove.

21. The hydroponic tower closing apparatus of claim 10, wherein said multi-piece hydroponic tower is a dual-sided hydroponic tower, wherein said tower body defines said first tower cavity and a second tower cavity, wherein said first body hinge member of said first edge portion of said tower body corresponds to said first tower cavity, said tower body further comprising a second body hinge member corresponding to a second edge portion of said tower body, said second tower body hinge member of said second edge portion of said tower body corresponding to said second tower cavity, said multi-piece hydroponic tower further comprising:
  a second tower face plate, wherein an edge portion of said second tower face plate includes a second face plate hinge member, wherein said second tower face plate is hingeably coupled to said tower body via said second tower body hinge member and said second face plate hinge member, wherein said second tower face plate is positionable relative to said tower body in at least a second tower cavity closed position and a second tower cavity open position, said second tower face plate comprising a second plurality of plant container cutouts configured to accept a second plurality of plant containers;
  a second fastener configured to temporarily latch said second tower face plate to said tower body when said second tower face plate is in said second tower cavity closed position; and
  said tower closing system further configured to (i) move said second tower face plate from said second tower cavity open position to said second tower cavity closed position, and (ii) latch said second tower face plate to said tower body with said second fastener.

22. The hydroponic tower closing apparatus of claim 21, said first modified V-shaped groove centered between said first tower cavity and said second tower cavity, and said second modified V-shaped groove centered between said first tower cavity and said second tower cavity.

23. The hydroponic tower closing apparatus of claim 22, said first inner groove wall substantially parallel to said first side of said tower body and substantially perpendicular to a first tower cavity rear wall, and said second inner groove wall substantially parallel to said second side of said tower body and substantially perpendicular to a second tower cavity rear wall.

* * * * *